United States Patent [19]

Cox

[11] 4,277,139

[45] Jul. 7, 1981

[54] SCULPTURED OPTICAL ART FORM

[76] Inventor: Michael Cox, 1311 Dixie Hwy. S., Pompano Beach, Fla. 33060

[21] Appl. No.: 859,384

[22] Filed: Dec. 12, 1977

[51] Int. Cl.³ .......................... G02B 27/24; G02B 5/04
[52] U.S. Cl. .................................. 350/286; 272/8 M; D11/133; 350/297
[58] Field of Search ............... 350/286, 321, 144, 297; 40/10 D; 65/107; D16/48, 51; D11/133; 272/8 M, 13; 264/1

[56] References Cited

U.S. PATENT DOCUMENTS

| | | | |
|---|---|---|---|
| 58,410 | 10/1866 | Hartell | 40/10 D |
| 170,243 | 11/1875 | Dressler | 40/10 D |
| 4,043,084 | 8/1977 | Kuris | D11/133 |

Primary Examiner—Jon W. Henry
Attorney, Agent, or Firm—Barry L. Haley

[57] ABSTRACT

A sculptured optical art form device and the method of making comprising a transparent block having a predetermined index of refraction to provide internal light reflection, said block having a cavity disposed in one wall, the cavity being shaped or carved as a symmetrical one-half of an object that is optically displayed as a whole object in the block. The transparent block may be constructed of an acrylic polymer or glass. The geometrical outside shape of the block is selected to provide an optical view through at least one wall to an observer such that light rays striking the wall having the cavity are internally reflected. The observer looking through the viewing wall will observe a complete, fully formed object optically created by the symmetrical one-half cavity formed in the block wall providing internal optical reflectance. In one embodiment, the object optically created by the cavity appears to be completely embedded in the center of the block.

7 Claims, 4 Drawing Figures

SCULPTURED OPTICAL ART FORM

BACKGROUND OF THE INVENTION

This invention relates generally to a novel art form in which a sculptured object appears optically to be embedded in a transparent block, and specifically to a sculptured art form including a transparent block of material having an index of refraction such as to produce internal reflection at one wall of the block, the internal reflecting wall having a cavity formed therein representative of one-half of an object to be viewed.

In present day techniques involving certain art forms, it is known to embed an object to be viewed in a transparent medium. Acrylic polymers and glass as art forms have been used for completely embedding such a three-dimensional object within the transparent material. This art form involves taking a fully formed object and submerging and suspending the object within the molten transparent material until the material has hardened.

The present invention utilizes a transparent block having a sculptured cavity in one wall and internal light ray reflectance that optically projects the image of the sculptured cavity such that the cavity appears to be a fully formed three-dimensional object embedded in the block.

When a light ray traverse from a more dense medium to a less dense medium, the light ray is said to be refracted at the interface or wall between the two media. The angle between the normal to the wall surface that the light ray strikes and the wall surface is called the angle of incidence while the angle of the light ray emerging from the more dense medium relative to a normal to the wall surface is called the angle of refraction. Under Snell's law, the ratio of the sin of the angle of incidence to the sin of the angle of refraction is a constant. When a light ray traverses from a more dense medium to one of less density, as the angle of incidence becomes greater, so does the angle of refraction. Increasing the angle of incidence results in reaching a particular angle where the refracted ray becomes tangent to the wall interface between the two media. This is called the critical angle. Increasing the angle of incidence above the critical angle will result in total internal light reflection within the more dense medium. It has been determined that transparent acrylic polymers, known under the trademarks PLEXIGLASS or LUCITE, have indicies of refraction of 1.491, very close to that of some glass. This produces a critical angle of around 43 degrees for the acrylic polymer.

The image of a point source light formed by a plane mirror lies on the normal to the mirror surface and is as far back behind the mirror optically as the point source is in front of the mirror. As image formed by light rays which do not actually originate from the viewed object but appear to do so, are called virtual images. In most cases, an object forms an image as a three-dimensional object when viewed in a plane mirror. Since for every point source of light on an object there corresponds a similar point source in its image when mirrored, the image appears three-dimensional also. In the present invention, a cavity formed on the interface wall of a transparent block that exhibits internal reflectance acts as the source of both a real and a virtual image. Optically, the cavity is viewed as a complete three-dimensional object if the cavity is formed as a symmetrical one-half of the object viewed. Moreover, the adjacent block walls may be angularly disposed relative to each other to provide multiple internal reflection such that when viewed through certain walls, the object formed by the cavity appears to be fully embedded inside the block.

In accordance with the instant invention, transparent blocks of an acrylic polymer are selected such that an observer can readily perceive one wall of the block as having internal light reflection. The symmetrical one-half of an object cavity is sculptured in one wall that is observed to have internal reflection.

BRIEF SUMMARY OF THE INVENTION

A device for providing an optical display using an acrylic polymer transparent block shaped to provide internal light ray reflection that is visually observable on a predetermined wall, said mirrored wall having a cavity formed therein shaped as a symmetrical one-half of an object to be displayed. The resultant visual display provides an observer with a complete, perfectly symmetrical object when viewing the mirrored wall through particular other walls of the transparent block at angles suitable for visually observing internal reflectance.

The cavity formed in the mirrored wall is manually formed using conventional techniques by the artists such as carving, grinding, sanding or even molding. The geometrical solid block selected may be shaped in the form of a prism, a pyramid, a parallelopiped or the like such that one wall will provide internal reflection when viewed through any one of the other remaining walls.

The method of producing the device includes the steps of 1) selecting a transparent solid block consisting of a material such as an acrylic polymer or glass shaped so that an observer can visually experience one wall having internal reflection and 2) forming a cavity in the observable internally reflectable wall surface, said cavity being preferably shaped as a symmetrical one-half of the object to be completely optically displayed. In another embodiment, the block walls include parallel front and back surfaces and angled side walls such that certain light rays are internally reflected at the front and back walls, as viewed through either angled side wall. A cavity in the back wall formed as one-half an object (or other selected subject) will be optically projected into the center region of the block when viewed through either side wall due to multiple internal reflection interaction between the front and back walls.

It is an object of this invention to provide a novel art from that provides a fully formed optical image of an object three-dimensionally within a translucent material.

It is another object of this invention to provide an optical display device using an acrylic polymer block having a cavity formed in one wall in which a visual display is presented showing a fully formed object of the cavity formed therein, that appears to be fully embedded in the block.

Yet still another object is to provide a method and device formed therefrom of an art form using transparent material presenting three-dimensional objects disposed therein.

In accordance with these and other objects which will be apparent hereinafter, the instant invention will now be described with particular reference to the accompanying drawing.

PREFERRED EMBODIMENT OF THE INVENTION

Figure 1:
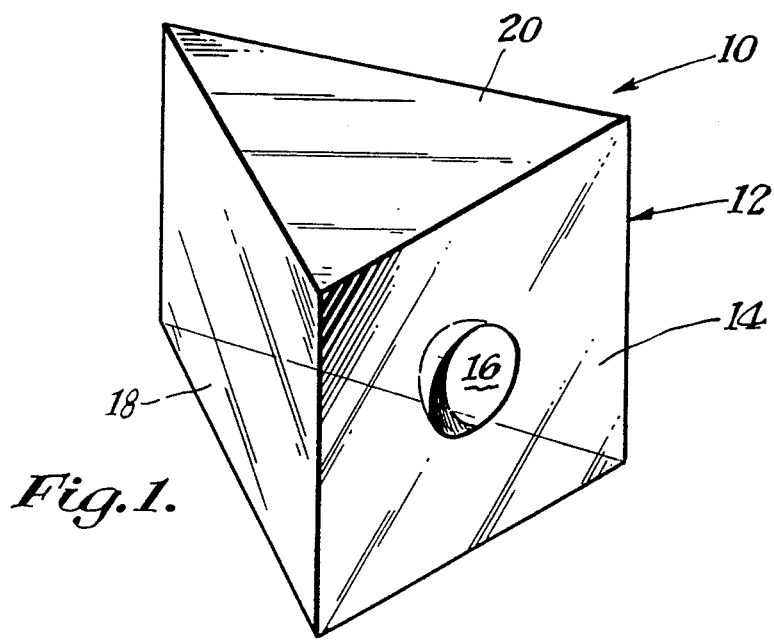
FIG. 1 is a perspective view of an art object constructed in accordance with the instant invention.
Figure 3:
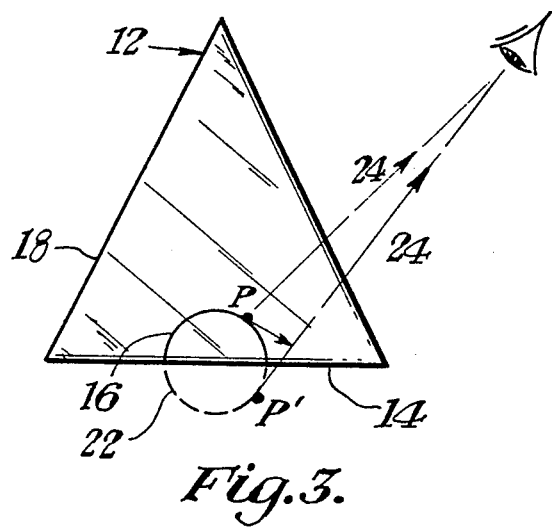
FIG. 3 shows a top plan view of the device shown in FIG. 1.

Referring now to the drawings, and specifically to FIGS. 1 and 3, one embodiment of the instant invention is shown generally at 10 comprised of a transparent solid block 12 which is in the form of a prism having a hemispherical cavity 16 formed in one wall 14 of the prism. The block 12 consists of a transparent acrylic polymer having an index of refraction of 1.491. The top and bottom prism walls 20 are parallel while the side walls are joined to form a triangular cross sectional shape. In such a prism, at the block-air interface wall 14, internal light rays striking wall 14 internally at an angle of approximately 45 degrees or more (relative to the normal) will be internally reflected.

FIG. 3 shows a light ray point source P on the cavity wall 16 which acts as a point source of light for light ray 24' which is internally reflected at the interface of wall 14 creating virtual image P'. The hemispherically shaped cavity 16 is observed as a complete sphere due to internal reflectance on wall 14 and the creation of a virtual image 22.

Figure 2:
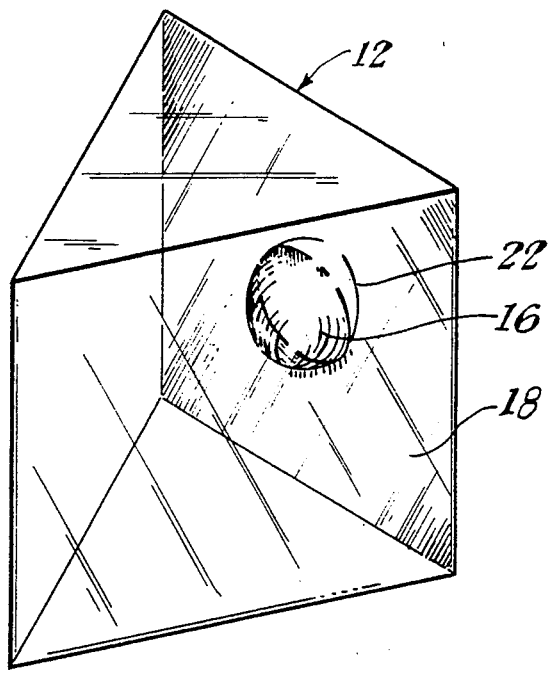
FIG. 2 shows a perspective view from a different angle of the device shown in FIG. 1 of the instant invention.

Referring now to FIG. 2, a visual sphere is presented comprised of point sources of light emanating from the cavity wall 16 and the virtual image 22 presented by internal reflectance in the back wall 14.

Figure 4:
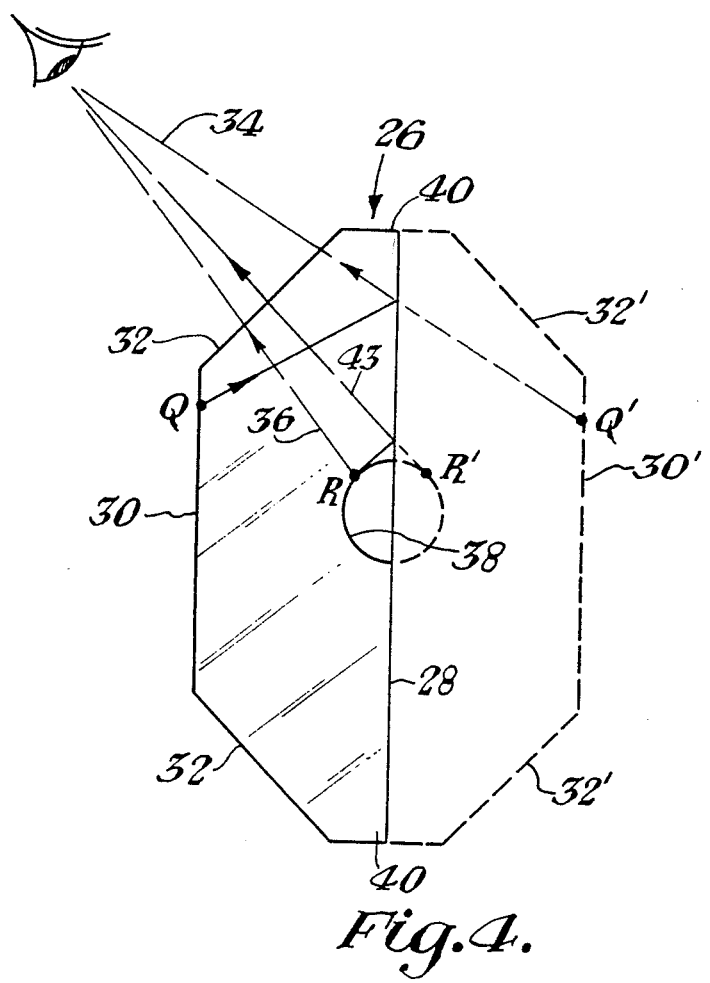
FIG. 4 is a perspective view of a device constructed in accordance with an alternate embodiment of the instant invention.

FIG. 4 shows an alternate embodiment of the invention in which a block is utilized having a back wall 28 with a hemispherical cavity 38 formed therein and a front wall 30 which is substantially parallel to the back wall. A pair of angled side walls 32 are likewise included which are angled relative to the back and front walls at approximately a 45 degree angle. The effect of having front and back parallel walls with the angled side walls 32, is that the observer experiences internal reflection that is observable off both the back and front walls as follows. A point R on the hemisphere can be observed through the angled side walls 32 as a real image. Likewise, using light ray 42, a virtual image point R' is also observed because of the internal reflection along back wall 28. Further, a point source Q which is a point on the front wall 30 is observed as a virtual image Q' from light ray 34. Overall, the observer will be looking at both the reflected internal front wall face as it appears as a virtual image behind the hemispherical cavity which is being projected as a total sphere. This optical affect provides the observer with an object formed by the cavity in the back wall which appears to be totally embedded in the center of the block because of the virtual image formed by the front wall and its reflectance off the back wall. The photograph, shown as FIG. 5, shows this illusion using a bear which has been sculptured in the back wall and which, because of the internal reflectance as described in FIG. 4, projects a fully formed three-dimensional appearing bear (and mountain scenery) such that the observer optically experiences a complete bear embedded totally within the central portion of the block. The angled side walls presented in this embodiment function such that some of the observed rays emerging perpendicularly from either side wall are internally reflected at angles within the block if the side wall surface angle relative to the back or front wall is greater than the critical angle so that internal reflection is observable on both the back and the front walls. As the angle between the front or back wall and a side wall is altered from the 45 degree angle shown, limiting angles will be reached where the internal reflectance from the front wall is not provided such that the observed sculptured cavity will not appear to be embedded completely within the block but (due to internal reflectance at the back wall) will still appear as a fully formed object, not just the 6 symmetrical one-half. Although a hemispherical cavity is shown, in the drawings for illustration any other object may be a subject of the cavity, the cavity being formed as a symmetrical one-half of a completed object to be observed.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method for optically producing a visual image of a three dimensionally complete object in a transparent medium comprising the steps of:
   (a) selecting a transparent geometrical solid of a particular shape having at least one wall observable of internal light reflection; and
   (b) forming a cavity in the wall having the observable internal reflection, said cavity being formed in the shape of a symmetrical one half of the three dimensional visual image displayed.

2. An art form as in claim 1, wherein step (a) includes: selecting a solid having substantially parallel front and back walls, and at least one side wall disposed at an angle to said back wall, said angle being between 25 degrees and 75 degrees.

3. A device for producing an optical display of a complete three dimensional object within a transparent geometrical solid comprising:
   a transparent member having a wall portion that provides optically internal light reflectance, said wall portion having a cavity formed therein in the shape of the symmetrical one half of said optically observable three dimensional object.

4. A device as in claim 3, wherein:
   said solid has an index of refraction between 1.3 and 1.7.

5. A device as in claim 3, wherein:
   the geometrical solid is a prism.

6. A device as in claim 3, wherein:
   said block includes substantially parallel front and back walls, and at least one sidewall disposed at an angle relative to said back wall to produce observable internal reflection of said front and back walls.

7. A device for creating an optical illusion of a fully three dimensional object embedded within a transparent block, comprising:
   a transparent block having a first wall and a second wall, said block consisting of a material for providing substantially total internal optical reflectance at said first wall when viewed through said second wall, said first wall having a cavity disposed therein, said cavity shaped as the symmetrical one-half of an object visually observable as a complete three dimensional object through said second wall.

* * * * *